(12) United States Patent
Ueki

(10) Patent No.: US 7,314,510 B2
(45) Date of Patent: Jan. 1, 2008

(54) INK JET LIQUID COMPOSITION AND INK JET RECORDING METHOD

(75) Inventor: Hiroyuki Ueki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 294 days.

(21) Appl. No.: 10/939,409

(22) Filed: Sep. 14, 2004

(65) Prior Publication Data

US 2005/0193921 A1 Sep. 8, 2005

(30) Foreign Application Priority Data

Mar. 8, 2004 (JP) ............................. 2004-064694

(51) Int. Cl.
C09D 11/02 (2006.01)
C09D 11/14 (2006.01)
B41J 2/01 (2006.01)

(52) U.S. Cl. .............................. 106/31.36; 106/31.43; 106/31.49; 106/31.58; 106/31.68; 106/31.75; 106/31.78; 106/31.86; 347/100

(58) Field of Classification Search ............. 106/31.36, 106/31.43, 31.49, 31.58, 31.68, 31.75, 31.78, 106/31.86; 347/100
See application file for complete search history.

(56) References Cited

U.S. PATENT DOCUMENTS 5,651,814 A * 7/1997 Shimomura et al. ..... 106/31.36
6,406,138 B1 * 6/2002 Gore ........................... 347/96
6,435,677 B1 * 8/2002 Koitabashi et al. ........... 347/96
6,460,989 B1 * 10/2002 Yano et al. .................. 347/101
6,536,890 B1 * 3/2003 Kato et al. ................... 347/100
6,582,047 B2 * 6/2003 Koitabashi et al. ........... 347/16
6,794,427 B2 * 9/2004 Kurabayashi et al. ....... 523/161
2005/0206702 A1 * 9/2005 Yamashita et al. .......... 347/100
2006/0057339 A1 * 3/2006 Adachi et al. ........... 428/195.1

FOREIGN PATENT DOCUMENTS

| JP | A-8-216386 | 8/1996 |
| JP | A-8-283640 | 10/1996 |
| JP | A-9-095636 | 4/1997 |
| JP | A-2002-2087 | 1/2002 |

* cited by examiner

Primary Examiner—Helene Klemanski
(74) Attorney, Agent, or Firm—Morgan, Lewis & Bockius LLP

(57) ABSTRACT

The present invention provides an ink jet liquid composition including chitosan and a non-volatile organic acid. The non-volatile organic acid preferably has two or more carboxyl groups and a cyclic structure other than an aromatic ring. Further, the invention provides an ink jet recording method of forming images on a recording medium surface by ejecting an ink and a liquid composition thereon so that the ink and the liquid are in contact with each other, wherein the ink contains a colorant, the liquid composition contains a component for coagulating the colorant, and the component for coagulating the colorant contains chitosan and a non-volatile organic acid.

16 Claims, No Drawings

INK JET LIQUID COMPOSITION AND INK JET RECORDING METHOD

CROSS-REFERENCE TO RELATED APPLICATION

This application claims benefit of and priority to Japanese Patent Application No. 2004-064694 filed on Mar. 8, 2004, which is incorporated herein by reference in its entirety for all purposes.

BACKGROUND OF THE INVENTION

1. Field of the Invention

The present invention relates to an ink jet recording method for recording images by ejecting ink in response to electrical signals, and to an ink jet recording method that satisfies requirements for ink jet recording such as, in particular, high printing quality and compatibility with regular paper and an ink jet liquid composition used in the method.

2. Description of the Related Art

The principle of an ink jet recording method is ejecting liquid ink or molten-solid ink from nozzles, slits, porous films or the like onto paper, cloth, film or the like. Various methods including the so-called electric charge-control method in which ink is ejected by using electrostatic attraction, the so-called drop-on-demand method (pressure pulse method) in which ink is ejected by using vibration pressure of a piezoelectric element, the so-called thermal inkjet process in which ink is ejected by using pressure caused by air bubbles generated and grown at high temperature, and the like, have been proposed as methods for ejecting ink, and thus these methods make it possible to form extremely high-definition images.

For example, an ink jet recording device that records images by ejecting liquids including at least an ink and an image-quality improving solution, which improves quality of the recorded images by being contacted or mixed with the ink, onto a recording medium according to input image data, and that is provided with an ejection data-calculating means that calculates an amount of the ejected liquid containing the image-quality improving solution from the amount of the ejected ink to form the images on the recording medium has been proposed, and extremely high-definition images are realized by this ink jet device (see, for example, Japanese Patent Application Laid-Open (JP-A) No. 8-216386).

Inks for the ink jet recording methods include aqueous dye inks wherein various water-soluble dyes are dissolved in liquid media containing water and a water-soluble organic solvent, aqueous pigment inks wherein various pigments are dispersed in liquid media containing water and a water-soluble organic solvent, oil-based dye inks wherein oil-soluble dyes are dissolved in organic solvents, and the like. Among these inks, aqueous dye inks and aqueous pigment inks have become the mainstream of ink jet recording inks, because the main solvent thereof is water and the inks are thus superior in safety.

Further, there are many requirements for the liquid compositions including the above-described inks for ink jet recording, and specific examples thereof include: (1) no clogging in nozzles of ink jet recording heads; (2) superior ejection stability and frequency responsiveness; (3) good recovery of smooth ink ejection after being left for a long time; (4) no generation of precipitates even after long-term storage; (5) no causing of corrosion-deterioration of members, such as the recording heads, which contact therewith; (6) provision of favorable printing quality; (7) safety and no unpleasant odor; and the like.

Recently there is a great demand for printed images having photo-like quality by using the ink jet printing technology, and development of higher resolution of printed images by using an ink jet recording method which uses ink droplets having smaller size is in progress. Further, ink jet printers are spreading widely in business applications because of advantages such as lower noise and lower running cost, and printing speeds higher than those of printers using an electrophotographic process have come to be desired. Thus, an ink jet recording method that satisfies requirements such as high water resistance, high speed printing, suppression of blurring and especially blurring between colors, and liquid compositions and the like for use in the recording method have come to be desired.

The drying property of the ink on paper media (recording media) must be improved for use in the above-described high-speed printing. In particular, a printed face of a printed paper medium discharged after being printed must not be stained by being stacked onto and rubbed against a printed medium that has been previously discharged.

It is possible to suppress the blurring between colors by, for example, ejecting as small ink droplets as possible and dividing the printing data so as to print images by plural head scanning. However, such a technique includes the problem of a decrease in printing speed per page.

Incidentally, an example that uses a chitosan derivative having a colorant structure at the side chain thereof as a constituent material for the liquid composition has been proposed (see, for example, JP-A No. 8-283640). However, the chitosan derivative is costly as it is prepared in a synthetic process, and further, the chitosan derivative cannot provide recorded images with sufficient storage stability. Further, an example that contains a succinylated carboxymethylchitosan and a lactic acid has been also proposed as the constituent material (see, for example, JP-A No. 9-95636). However, the composition is not sufficiently effective in suppressing blurring. Furthermore, an example that contains a polymer that is reactive with chitosan salts has been also proposed as the constituent material (see, for example, JP-A No. 2002-2087). However, the composition cannot provide a sufficient ejection stability due to increase in the viscosity of ink.

As described above, there are currently no ink jet recording inks that can satisfy the various requirements in performance for the ink jet recording method. In particular, conventional ink jet recording liquids (inks) having high drying speed do not provide sufficiently advantageous effects even in combination with various processing solutions.

SUMMARY OF THE INVENTION

Considering the problems of the above-described conventional art, the present invention provides an ink jet recording method that can satisfy various requirements for the ink jet recording method, and a liquid composition for use therein, and in particular, an ink jet liquid composition that can satisfy the various requirements such as high water resistance, shorter drying time, suppression of blurring and especially blurring between colors, and additionally superior storage stability, and an ink jet recording method using the same.

After intensive studies, the present inventors have accomplished the present invention, which relates to an ink jet recording method of ejecting an ink jet liquid composition containing chitosan dissolved in a non-volatile organic acid onto a recording medium surface so that the liquid composition is brought into contact with an ink thereon during ink jet recording.

Namely, a first aspect of the invention is an ink jet liquid composition which comprises chitosan and a non-volatile organic acid.

A second aspect of the invention is an ink jet recording method of forming images on a recording medium surface by ejecting an ink and a liquid composition thereon so that the ink and the liquid composition are in contact with each other, wherein: the ink contains a colorant; the liquid composition contains a component for coagulating the colorant; and the component for coagulating the colorant contains chitosan and a non-volatile organic acid.

A third aspect of the invention is an ink set for ink jet recording, comprising an ink and a liquid composition, wherein: the ink contains a colorant; the liquid composition contains a component for coagulating the colorant; and the component for coagulating the colorant contains chitosan and a non-volatile organic acid.

The invention provides an ink jet recording method and an ink jet liquid composition that can form images having high water resistance, suitability for high-speed printing, and fewer blurring between colors.

DETAILED DESCRIPTION OF THE INVENTION

Hereinafter, the present invention will be described in detail.

Ink Jet Liquid Composition

The ink jet liquid composition according to the invention (hereinafter it may simply referred to as "liquid composition") contains at least chitosan and a non-volatile organic acid as the components for coagulating colorants. The liquid composition contains water and a water-soluble organic solvent as primary components in addition to chitosan and the non-volatile organic acid.

As will be described below, images are formed by bringing an ink containing at least one colorant into contact with a liquid composition containing at least a component for coagulating colorants in the invention, and use of a liquid composition according to the invention as the liquid composition above provides improvement in image quality, image uniformity, suppression of blurring between colors on conventional ink sets for recording.

Chitosan used in the invention is a deacetylated compound from chitin having a structure of (1→4)-2-acetamido-2-deoxy-β-D-glucan. Chitin is a natural material found in an extremely various organisms including shrimps, crabs, insects, shellfishes, and mushrooms. Although chitosan has a structure similar to cellulose, chitosan is an aminopolysaccharide having chainly-bound N-acetyl-D-glucosamine units. Chitosan is a chain-form polymer prepared by deacetylation of chitin by an alkali treatment, which contains mainly D-glucosamine units.

The liquid composition containing chitosan according to the invention is cationic, and thus reacts with anionic materials such as dyes and pigments commonly used as colorants in ink jet recording inks. It is possible to suppress blurring, especially blurring between colors, by accelerating coagulation of the colorants by using the reaction. In addition, the water resistance can be improved by the action of chitosan, which exhibits a high affinity to cellulose in regular paper.

Chitosan, that is one component of the liquid composition according to the invention, may be used with no limitation of binding patterns, such as α, β, or γ. The deacetylation degree of chitosan is preferably about 70% or more, more preferably about 80% or more, and still more preferably about 90% or more, from the viewpoints of solubility and the cationic character of the liquid composition. As described above, chitosan gains after deacetylation amino groups, which are responsible for the cationic nature of the liquid composition. The liquid composition should be strongly cationic when the ink is spotted in the invention, and if the deacetylation degree is less than 70%, the liquid composition is less cationic and may not react sufficiently with the colorants.

For improvement in the solubility in water as will be described below, chitosan preferably has a lower molecular weight and the solubility may be improved by introducing various functional groups into the chitin or chitosan main chain.

An organic acid such as acetic acid, formic acid, citric acid, tartaric acid, lactic acid, propionic acid, or ascorbic acid, an inorganic acid such as dilute hydrochloric acid or dilute nitric acid is commonly used for dissolving chitosan into water, but a non-volatile organic acid is used for the liquid composition according to the invention. If a volatile organic acid is used for improvement of the solubility in water, chitosan may be insolubilized during long-term storage due to vaporization of the organic acid.

The non-volatile acid means an acid having a lower vapor pressure at room temperature and a boiling point of about 200° C. or more at normal pressure.

The non-volatile organic acids include, for example, citric acid, 2-pyrrolidone-5-carboxylic acid, tartaric acid and the like.

The non-volatile organic acids are preferably those having two or more carboxyl groups and more preferably those having three or more carboxyl groups. If an acid having two or more carboxyl groups is used as the non-volatile organic acid, the storage stability of the resulting liquid composition containing chitosan becomes better.

Examples of the non-volatile organic acids having two or more carboxyl groups among the acids above include citric acid, tartaric acid and the like.

Organic acids having a cyclic structure other than an aromatic ring may be also preferably used as the non-volatile organic acid, and organic acids having a pyrrolidine ring, a cyclohexane ring, or the like are more preferable. When an acid having a cyclic structure other than an aromatic ring is used as the non-volatile organic acid, the storage stability of the resulting liquid compositions increase in the same way as above.

The non-volatile organic acids having a cyclic structure other than an aromatic ring include, for example, 2-pyrrolidone-5-carboxylic acid, cyclohexanecarboxylic acid and the like.

The non-volatile organic acids may be used alone or in combination of two or more in the invention.

The mass ratio of the chitosan to the non-volatile organic acid in the liquid composition according to the invention (chitosan: non-volatile organic acid) is preferably in the range of about 1:50 to 50:1 and more preferably in the range of about 1:10 to 10:1. If chitosan is present at a mass ratio of less than about 1:50, the liquid composition may not coagulate the colorants in ink sufficiently when brought into contact with the ink. Alternatively, if chitosan is present at a mass ratio of more than about 50:1, the images printed with the ink may be occasionally peeled off from the medium.

The total amount of chitosan and the non-volatile organic acid in the liquid composition according to the invention is preferably in the range of about 0.1 to 10% by mass with respect to the total amount of the composition, more preferably in the range of about 0.5 to 5% by mass, and still more preferably in the range of about 1 to 3% by mass. If the amount of chitosan and the non-volatile organic acid added in the liquid composition is less than about 0.1% by mass, the coagulation of colorants when the liquid composition is brought into contact with an ink, which will be described below, may become insufficient, occasionally leading to deterioration in the optical density of printed images, blurring, and blurring between colors. On the contrary, if the addition amount is over about 10% by mass, the ejection property of the liquid reduced and the liquid may not be ejected normally.

A water-soluble organic solvent may be contained in the liquid composition according to the invention.

Examples of the water-soluble organic solvents include polyvalent alcohols, polyvalent alcohol derivatives, nitrogen-containing solvents, alcohols, and sulfur-containing solvents. Specific examples of the polyvalent alcohols include ethylene glycol, diethylene glycol, propylene glycol, butylene glycol, triethylene glycol, 1,5-pentanediol, 1,2,6-hexanetriol, glycerin and the like.

Examples of the polyvalent alcohol derivatives include ethylene glycol monomethylether, ethylene glycol monoethylether, ethylene glycol monobutylether, diethylene glycol monomethylether, diethylene glycol monoethylether, diethylene glycol monobutylether, propylene glycol monobutylether, dipropylene glycol monobutylether, ethylene oxide adducts of diglycerin, and the like.

Specific examples of the nitrogen-containing solvents include pyrrolidone, N-methyl-2-pyrrolidone, cyclohexylpyrrolidone, triethanolamine and the like; examples of the alcohols include ethanol, isopropyl alcohol, butyl alcohol, benzyl alcohol and the like; and examples of the sulfur-containing solvents include thiodiethanol, thiodiglycerol, sulfolane, dimethylsulfoxide and the like. In addition, propylene carbonate, ethylene carbonate and the like may also be used.

The water-soluble organic solvents may be used alone or in combination of two or more thereof. The content of the water-soluble solvent is preferably in the range of about 3 to 40% by mass and more preferably in the range of about 10 to 35% by mass. If the amount of the water-soluble organic solvent in the liquid composition is less than about 3% by mass, the liquid composition tends to dry and crystallize more easily, often leading to imperfect ejection caused by nozzle clogging, while if the amount is more than about 40% by mass, the liquid composition becomes less fixable on paper and the ejection property of the liquid becomes unstable due to increase in liquid viscosity.

Water is normally contained in the liquid composition according to the invention; ion-exchange water, distilled water, pure water, ultrapure water and the like may be used as the water; and ultrapure water is particularly preferably used for prevention of contamination by polyvalent cations, microbes and the like and of clogging and for improvement in storage stability. The amount of water added is not particularly limited, but preferably about 10% or more and about 99% by mass or less, more preferably about 30% by mass or more and about 80% by mass or less by weight with respect to the total amount of the liquid composition.

The liquid composition may be used as the processing solution in the form of colorless transparent solution or as a color ink in the form of color solution containing a colorant. In such a case, the liquid composition preferably contains a colorant additionally. The colorant contained in the liquid composition may be a pigment or dye similar to that used the ink described below.

If a colorant is contained in the liquid composition, the colorant is contained preferably in an amount in the range of about 10 to 20% by mass and more preferably in the range of about 3 to 10% by mass with respect to the total amount of liquid composition.

In addition, the liquid composition may contain additives such as surfactant and the like, which will be described below.

The surface tension of the liquid composition according to the invention is preferably about 35 mN/m or less, more preferably in the range of about 25 to 33 mN/m, and still more preferably in the range of about 28 to 31 mN/m. If the surface tension is about 35 mN/m or less, the image drying time becomes shorter and the superior image quality described above can be obtained at the same time.

The surface tension is determined under an environment of 23° C. and 55% RH by using a Wilhelmy surface tension balance in the similar manner to above.

The viscosity of the liquid composition according to the invention is preferably in the range of about 2 to 10 mPa·s and more preferably in the range of about 3 to 5 mPa·s. If the viscosity of the liquid composition is more than about 10 mPa·s, ink ejection may become unmanageable. On the other hand, if the viscosity is less than about 2 mPa·s, the long-term ejection stability may deteriorate.

The viscosity (including that described below) is determined by using a rotational viscometer Rheomat 115 (trade name, manufactured by Contraves Co.) at 23° C. and a shear rate of 1,400 s$^{-1}$.

The liquid composition according to the invention contains characteristically the components above for coagulating colorants, and the coagulation capacity thereof is expressed by the number of coarse particles such as the aggregates containing the colorants in the mixed solution prepared by mixing an ink and the liquid composition.

In the invention, the number of coarse particles having a diameter of 5 μm or more present in the mixed solution is preferably about 500/μL or more, more preferably in the range of about 500 to 10,000/μL, and still more preferably in the range of about 500 to 3,000/μL. When the number of coarse particles having a particle diameter of 5 μm or more present in the mixed solution is less than about 500/μL, the optical density of the images formed declined in some cases.

The number of coarse particles having a diameter of 5 μm or more in the mixed solution of ink and liquid composition is determined by mixing the two liquids at a mass ratio of 1:1, and collecting 2 μL of the mixed solution while stirred, and analyzing the sample using the Accusizer™ 770 Optical Particle Sizer (manufactured by Particle Sizing Systems Co.). As a parameter in the measurement, the density of the pigment used is input as the density of dispersed particles. The density of pigment may be determined by measuring the pigment powder that is obtained by mixing the first and second liquids and heating and drying the resulting pigment dispersion, by using a densitometer, specific-density bottle and the like.

Ink Jet Recording Method

Hereinafter, the ink jet recording method according to the invention will be described.

The ink jet recording method according to the invention is an ink jet recording method by using an ink set for ink jet recording containing an ink containing at least one colorant and a liquid composition containing at least the component for coagulating colorants, and forming images by ejecting the ink and the liquid composition so that the ink and the liquid composition are brought into contact with each other, wherein the liquid composition contains at least chitosan and a non-volatile organic acid as the components for coagulating colorants.

In the invention, when applying ink and the like onto a recording medium to form images, the ink and the liquid composition according to the invention are applied so that they are brought into contact with each other. The colorants in ink coagulate by the action of the chitosan and non-volatile organic acid when the ink and the liquid composition are brought into contact with each other, providing a recording method superior in optical density, suppressing of blurring, suppressing of blurring between colors, and shorter drying time. The embodiment of bringing the two liquids into contact is not particularly limited, and, for example, the two liquids may be ejected so that the liquids are applied to be adjacent with each other, or a liquid may be applied on the region where another liquid is previously applied.

With regard to the order of applying the two liquids sequentially when the liquids are applied onto a recording medium, it is preferable to apply the liquid composition firstly and then eject the ink. It is because earlier application of the liquid composition enables more efficient coagulation of the constituent components (colorants) in ink. The ink may be applied at any time after the liquid composition is ejected, but the ink liquid is preferably applied at an interval of about 0.1 second or less after ejection of the liquid composition.

The ink according to the invention contains at least a colorant, and may contains other components such as water, water-soluble organic solvent, surfactant and the like if necessary.

The colorants used in the ink may be dyes or pigments, and preferably one or more pigments. It is because pigments are more easily coagulate than dyes coagulate when the ink and the liquid composition are mixed and further realize superior light fastness and higher water resistance. Further, there is recently an increasing demand for black images that are widely used in offices for printing documents. When carbon black, which is a black pigment, is used in black ink, such market demands can be satisfied as for such recording device or recording method, as it provides printed images that are superior in water resistance and light fastness. Among pigments, pigments dispersed in polymer dispersant, self-dispersible pigments, and resin-coated pigments are preferable.

Both organic pigments and inorganic pigments may be used as the pigment of the invention. Examples of the inorganic pigments include titanium oxide, iron oxide, carbon blacks produced by contact method, Fernest method, thermal method and the like. Examples of the organic pigments include polycyclic pigments such as azo pigment, phthalocyanine pigment and anthraquinone pigment; nitro pigments; aniline blacks; nitroso pigments and the like. Dispersed dyes may be used in place of the pigments.

The pigments for use in the invention include, in addition to black pigments and three primary color pigments of cyan, magenta, and yellow, specific color pigments such as red, green, blue, brown, white and the like; metallic glossy pigments such as those in gold, silver and the like; colorless or pale colored extender pigments; plastic pigments; and the like. In addition, particles having silica, alumina, polymer bead and the like as the core and a dye or pigment immobilized on the surface thereof; insoluble dye lakes; colored emulsions; colored latexes and the like may also be used as the pigment. Further, pigments that are newly synthesized for the invention may also be used.

Specific examples of the black pigments are carbon blacks including: RAVEN® 7000, RAVEN® 5750, RAVEN® 5250, RAVEN® 5000 ULTRA II, RAVEN® 3500, RAVEN® 2500ULTRA, RAVEN® 2000, RAVEN® 1500, RAVEN® 1255, RAVEN® 1250, RAVEN® 1200, RAVEN® 1190 ULTRA II, RAVEN® 1170, RAVEN® 1080 ULTRA, RAVEN® 1060 ULTRA, RAVEN® 790 ULTRA, RAVEN® 780 ULTRA, and RAVEN® 760 ULTRA (heretofore, manufactured by Columbian Chemicals Company); REGAL® 400R, REGAL® 330R, REGAL® 660R, MOGUL® L, MONARCH® 700, MONARCH® 800, MONARCH® 880, MONARCH® 900, MONARCH® 1000, MONARCH® 1100, MONARCH® 1300, and MONARCH® 1400 (heretofore, manufactured by Cabot Corporation); Color Black FW1, Color Black FW2, Color Black FW2V, Color Black 18, Color Black FW200, Color Black S150, Color Black S160, Color Black S170, Printex 35, Printex U, Printex V, Printex 140U, Printex 140V, Special Black 6, Special Black 5, Special Black 4A, and Special Black 4 (heretofore, trade names, manufactured by Degussa); No. 25, No, 33, No. 40, No. 47, No. 52, No. 900, No. 2300, MCF-88, MA600, MA7, MA8, and MA100 (heretofore, trade names, manufactured by Mitsubishi Chemical Co., Ltd.); and the like, but the carbon blacks are not limited thereto. Alternatively, a magnetic fine particle such as magnetite or ferrite, titan black and the like may be used as the black pigment.

The pigments that are self-dispersible in water used in the invention are pigments having many water-solubilizing groups on the pigment surface that are dispersible in water in the absence of polymer dispersant. Specifically, such pigments self-dispersible in water may be obtained by subjecting common so-called pigments to a surface modification treatment such as acid-base treatment, coupling agent treatment, polymer-grafting treatment, plasma treatment, oxidation/reduction treatment and the like.

In addition to the surface-modified pigments described above, commercially available self-dispersible pigments including CAB-O-JET®-200, CAB-O-JET®-250, CAB-O-JET®-260, CAB-O-JET®-270, CAB-O-JET®-300, IJX-444 (trade name), and IJX-55 (trade name) manufactured by Cabot Corporation; Microjet Black CW-1 (trade name), Microjet Black CW-2 (trade name) manufactured by Orient Chemical Industries, Ltd.; self-dispersible pigments sold from Nippon Shokubai Co., Ltd.; and the like may also be used as the pigments self-dispersible in water.

Examples of the cyan pigments include, but are not particularly limited to, C.I. Pigment Blue-1, -2, -3, -15, -15:1, -15:2, -15:3, -15:4, -16, -22, -60 and the like.

Examples of the magenta pigments include, but are not particularly limited to C.I. Pigment Red-5, -7, -12, -48, -48:1, -57, -112, -122, -123, -146, -168, -184, -202 and the like.

Examples of the yellow pigments include, but are not particularly limited to C.I. Pigment Yellow-1, -2, -3, -12, -13, -14, -16, -17, -73, -74, -75, -83, -93, -95, -97, -98, -114, -128, -129, -138, -151, -154, -180 and the like.

In addition, so-called encapsulated dyes or pigments containing particular colorants encapsulated in various resins may be used as the colorants in particular colors.

On the other hand, a water-soluble or disperse dye may be used as the dye for use in the invention. Specific examples of the water-soluble dyes include C.I. Direct Black-2, -4, -9, -11, -17, -19, -22, -32, -80, -151, -154, -168, -171, -194, and -195; C.I. Direct Blue-1, -2, -6, -8, -22, -34, -70, -71, -76, -78, -86, -112, -142, -165, -199, -200, -201, -202, -203, -207, -218, -236, -287, and -307; C.I. Direct Red-1, -2, -4, -8, -9, -11, -13, -15, -20, -28, -31, -33, -37, -39, -51, -59, -62, -63, -73, -75, -80, -81, -83, -87, -90, -94, -95, -99, -101, -110, -189, and -227; C.I. Direct Yellow-1, -2, -4, -8, -11, -12, -26, -27, -28, -33, -34, -41, -44, -48, -58, -86, -87, -88, -132, -135, -142, -144, and -173; C.I. Food Black-1 and -2; C.I. Acid Black-1, -2, -7, -16, -24, -26, -28, -31, -48, -52, -63, -107, -112, -118, -119, -121, -156, -172, -194, and -208; C.I. Acid Blue-1, -7, -9, -15, -22, -23, -27, -29, -40, -43, -55, -59, -62, -78, -80, -81, -83, -90, -102, -104, -111, -185, -249, and -254; C.I. Acid Red-1, -4, -8, -13, -14, -15, -18, -21, -26, -35, -37, -52, -110, -144, -180, -249, -257, and -289; C.I. Acid Yellow-1, -3, -4, -7, -11, -12, -13, -14, -18, -19, -23, -25, -34, -38, -41, -42, -44, -53, -55, -61, -71, -76, -78, -79, and -122; and the like.

Specific examples of dispersed dyes include C.I. Disperse Yellow-3, -5, -7, -8, -42, -54, -64, -79, -82, -83, -93, -100, -119, -122, -126, -160, -184:1, -186, -198, -204, and -224; C.I. Disperse Orange-13, -29, -31:1, -33, -49, -54, -66, -73, -119, and -163; C.I. Disperse Red-1, -4, -11, -17, -19, -54, -60, -72, -73, -86, -92, -93, -126, -127, -135, -145, -154, -164, -167:1, -177, -181, -207, -239, -240, -258, -278, -283, -311, -343, -348, -356, and -362; C.I. Disperse Violet-33; C.I. Disperse Blue-14, -26, -56, -60, -73, -87, -128, -143, -154, -165, -165:1, -176, -183, -185, -201, -214, -224, -257, -287, -354, -365, and -368; C.I. Disperse Green-6:1 and -9; and the like.

The volume average particle diameter of the colorant particles in ink is preferably in the range of about 30 to 250 nm. The volume average particle diameter of the colorant particles is a particle diameter of the colorant per se or of the additive-adhered particles when additives such as dispersant and the like are adhered to the colorant. In the invention, Microtrack UPA Particle Distribution Analyzer (Leeds & Northrup) is used for measurement of the volume average particle diameter. The measurement is performed by placing 4 ml of ink in the measuring cell according to a predetermined method. As the parameters to be input during measurement, the viscosity of the is used as the viscosity and the density of the dispersed particles as the pigment density.

The volume average particle diameter is more preferably in the range of about 50 to 200 nm and still more preferably in the range of about 75 to 175 nm. If the volume average particle diameter of the particles in the ink is less than about 30 nm, the optical density of the resulting printed images may become lower, while if it is more than about 250 nm, the storage stability of the ink may decline.

The addition amount of the colorants for use in the invention is preferably in the range of about 3 to 15% by mass, more preferably in the range of about 5 to 10% by mass. If the amount of the colorants in the liquid is less than about 3% by mass, the optical density of the resulting printed images may become lower, while if the amount of colorants is more than about 15% by mass, the ejection property of the liquid may become unstable.

In the invention, a water-soluble organic solvent is preferably used as the material for providing the resulting ink with water retentivity and adjusting the liquid viscosity. Nozzle clogging at the ink jet recording heads and ejection failure after being left for a long time are the results of the following phenomena primarily caused by vaporization of water and other components in the ink composition in the vicinity of the heads. That is, one is coagulation and precipitation of colorants leading to nozzle blockage or clogging, and the other is increase in the concentration of the water-soluble organic solvent contained as the water retention agent or viscosity adjuster, leading to drastic increase in the viscosity of ink and consequently increase in the energy required to eject the ink.

The vaporization of water and other components in the ink composition, may be suppressed to some extent by increasing the amount of the high-boiling water-soluble organic solvent added, but in such a case, the viscosity of the ink also increases, sometimes resulting in nozzle clogging and improper ejection stability.

Water-soluble organic solvents similar to those used for the liquid composition above, for example, may be used as the water-soluble organic solvent, but may additionally contain at least one solvent selected particularly from polyvalent alcohol and glycol ether. Addition of these water-soluble organic solvents to ink jet recording inks leads to further increase in ink's water retentivity and the solubility of the colorant therein, preventing clogging, preserving the ejection stability of ink jet recording inks, and additionally preventing coagulation and precipitation of the colorants after long-term storage.

More specifically, ethylene glycol, diethylene glycol, triethylene glycol, glycerin, and 2,2'-thiodiethanol are particularly preferable from the viewpoint of the solution stability of colorants. Glycol ethers are also preferable from the viewpoint of the permeability of the ink jet recording ink into paper.

The water-soluble organic solvents for use in the invention may be used alone or as a mixture of two or more solvents. The content of the water-soluble solvent is preferably in the range of about 3 to 40% by mass and more preferably in the range of about 10 to 35% by mass. If the amount of the water-soluble organic solvent in ink is less than about 3% by mass, the ink dries or precipitates more easily, often causing the incidences of imperfect ejection such as nozzle clogging and the like, while if it is more than about 40% by mass, the ink may become less fixable on paper or the viscosity of the liquid increases, making the liquid ejection unstable.

In addition to the water-soluble organic solvents above, the water-soluble organic solvent may be selected accordingly, for example, from alcohols such as ethanol, isopropanol, butanol, and benzyl alcohol; 2-pyrrolidone, N-methyl-2-pyrrolidone and the like, and the amount used is preferably in the range of about 1 to 40% by mass with respect to the total amount of ink.

The content of water in the ink is preferably in the range of about 10 to 50% by mass and particularly preferably in the range of about 20 to 40%. If the water content is less than about 10% by mass, the ejection stability of the ink may decline, sometimes impairing normal ejection.

On the contrary, if it is more than about 50% by mass, the long-term storage stability may deteriorate.

The surface tension of the ink above is preferably in the range of about 20 to 60 mN/m, more preferably in the range of about 20 to 45 mN/m, and still more preferably in the range of about 25 to 35 mN/m. If the surface tension is less than about 20 mN/m, the liquid may exude from nozzles, occasionally prohibiting normal printing. On the contrary, if it is more than about 60 mN/m, the permeability of the liquid may decline, elongating the drying time of ink.

The liquid viscosity of the ink is preferably in the range of about 2 to 10 mPa·s. If the viscosity is less than about 2 mPa·s, the increase in viscosity on a recording medium may be insufficient, occasionally deteriorating the image quality-improving effect and damaging the ejection stability and the like. Alternatively, if it is more than about 10 mPa·s, the ejection stability may be insufficient, occasionally causing hollow and thin spots.

The liquid viscosity above is determined by the above-mentioned method.

A polymer compound may also be added to the ink for use in the invention for dispersion of the colorant and improvement in various properties. Usable polymer compounds include water-soluble resins known in the art such as synthetic polymers produced in polymerization reactions and natural resins, and polymer emulsions thereof. Favorable polymer compounds to be used are polymer compounds produced by polymerizing a monomer containing one or more carboxyl groups as its hydrophilic groups for dissolution and dispersion in water, or salts thereof.

Examples of the monomers containing one or more carboxyl groups include acrylic acid, methacrylic acid, maleic acid, crotonic acid, itaconic acid, itaconic acid monoester, maleic acid, maleic monoester, fumaric acid, and fumaric acid monoester.

In addition, styrene derivatives such as styrene, α-methylstyrene, and vinyl toluene; monomers such as vinyl naphthalene, vinyl naphthalene derivatives, alkyl acrylate esters, alkyl methacrylate esters, crotonic acid alkylesters, itaconic acid dialkylesters, and maleic acid dialkylesters; monomers having a sulfonic acid group, hydroxyl group, polyoxyethylene, or other group may be copolymerized together with the monomers above, for adjustment of the properties of the resulting polymers such as acid value.

These polymer compounds having the acidic group above are preferably used as the neutral salts. These polymer compounds may be neutralized with a variety of basic substances, but preferably with a basic substance containing an alkali metal hydroxide. The alkali metal hydroxides include NaOH, KOH, and LiOH, and among which NaOH is preferable.

In addition to the polymer compounds above, polymer compounds such as polyvinyl alcohol, polyvinylpyrrolidone, polyacrylamide, and poly-N-vinylacetamide may also be used. Further, natural polymer compounds such as alginic acid may also be used.

When the polymer compound is a water-soluble polymer compound, the number-average molecular weight of the polymer compound is preferably in the range of about 1,000 to 30,000 and more preferably in the range of about 3,000 to 15,000. If the molecular weight is too much, the viscosity of the ink in nozzles increases due to a short-term thickening phenomenon, occasionally leading to delay and failure of ejection, and consequently drastic decrease in the quality of printing images. On the contrary, if the molecular weight is too little, the advantageous effect of suppressing blurring between colors according to the invention may be insufficient.

Hereinafter, additives for use if necessary in the ink according to the invention and the liquid composition according to the invention will be described.

A surfactant may be contained in the ink and liquid compositions. If a surfactant is added to the ink, the surfactant not only enhances penetration of the liquid composition into paper but also dispersed stably the colorants therein by interacting with the colorant molecules, consequently leading to prevention of nozzle clogging, deterioration of the ejection stability of liquid composition, as well as coagulation and precipitation of the colorants during storage for an extended period of time. The surfactant also improves the wettability of colorants with paper fibers and enables prevention of the deterioration in image quality such as unevenness in color and in color tone.

Compounds having a structure containing both hydrophilic and hydrophobic portions in the molecule are effectively used, and any one of anionic, amphoteric, and nonionic surfactants may be used as the surfactant according to the invention. Further, a polymer dispersant may be used.

Examples of the anionic surfactants include alkylbenzenesulfonate salts, alkylphenylsulfonate salts, alkylnaphthalenesulfonate salts, higher fatty acid salts, higher fatty acid ester sulfate ester salts, higher fatty acid ester sulfonate salts, higher alcohol ether sulfate ester salts and sulfonate salts, higher alkyl sulfosuccinate salts, higher alkyl phosphate ester salts, and higher alcohol ethylene oxide adduct phosphate ester salts; and effective examples thereof include dodecylbenzenesulfonate salts, isopropylnaphthalenesulfonate salts, monobutylphenylphenol monosulfonate salts, monobutylbiphenylsulfonate salts, monobutylbiphenylsulfonate salts, and dibutylphenylphenol disulfonate salts.

Examples of the nonionic surfactants include polypropylene glycol ethylene oxide adducts, polyoxyethylene nonylphenylether, polyoxyethylene octylphenylether, polyoxyethylene dodecylphenylether, polyoxyethylene alkylethers, polyoxyethylene fatty acid esters, sorbitan fatty acid esters, polyoxyethylene sorbitan fatty acid esters, fatty acid alkylol amides, acetylene glycol, acetylene glycol oxyethylene adducts, aliphatic alkanolamides, glycerin esters, and sorbitan esters.

Examples of the amphoteric surfactants include lauryldimethylaminoacetic acid betaine, betaine, sulfobetaine, sulfate betaine, and imidazolidone betaine.

In the invention, nonionic surfactants, which are less interactive with the ions of colorants and other components, are favorable among these surfactants, and polyoxyethylene alkylethers, polyoxyethylene alkylphenylethers, polyoxyethylene-polyoxypropylene block copolymers, and acetylene glycol ethylene oxide adducts are more preferable from the points of thermal stability and purity.

The amount of the surfactant added to the ink and the liquid composition according to the invention is preferably less than about 10% by mass, more preferably in the range of about 0.01 to 5% by mass, and still more preferably in the range of about 0.01 to 3% by mass. If the addition amount is about 10% by mass or more, the optical density and the storage stability of the pigment ink may occasionally deteriorate.

In addition, polyethyleneimine, polyamines, polyvinylpyrrolidone, polyethylene glycol, cellulose derivatives such as ethylcellulose and carboxymethylcellulose, polysaccharides and the derivatives thereof, other water-soluble polymers, acrylic polymer emulsions, polyurethane emulsions, polymer emulsions such as hydrophilic latexes, hydrophilic polymer gels, cyclodextrin, macrocyclic amines, dendrimers, crown ethers, urea and the derivatives thereof, acetamide, silicone surfactants, fluorine surfactants and the like may be used for the purpose of improving the properties of ink including ejection property and the like.

Further, an acid such as hydrochloric acid, sulfuric acid, nitric acid, acetic acid, citric acid, oxalic acid, malonic acid, boric acid, phosphoric acid, or phosphorous acid; a base such as sodium hydroxide, potassium hydroxide, lithium hydroxide, or ammonia; one of various buffer agents including phosphate salts, oxalate salts, and Good buffers such as amic acid salts, aminoethanesulfonic acid, N,N-bis(2-hydroxyethyl)-2-aminoethanesulfonic acid, acetamidoglycine, N-carbamoylmethyliminodiacetic acid, N-tris(hydroxy methyl)methyl-3-aminopropanesulfonic acid, and N,N-bis (2-hydroxyethyl)glycine; and the like may be added for adjustment of conductivity or pH.

Additionally, various viscosity adjusters hitherto known in the art, fungicides such as sodium dehydroacetate and sodium benzoate; bactericides such as PROXEL (trade name, manufactured by ICI Americas Inc.) and DOWICIL (trade name, manufactured by Dow Chemical Company); and conductive agents, antirusts, antioxidants, chelating agents, ultraviolet absorbents, and the like may also be added.

Hereinafter, the ink jet recording method according to the invention will be described in more detail.

The ink jet recording method according to the invention is used in recording devices by the common ink jet recording method. When used, the mass of the liquid per droplet both of the ink and the liquid composition above is preferably in the range of about 0.0005 to 0.1 ng and more preferably in the range of about 0.001 to 0.04 ng. If the liquid mass per droplet is in the range of about 0.001 to 0.04 ng, both of image quality and drying property can be easily obtained especially on regular paper.

In recording devices by the ink jet process that allows ejection of droplets in multiple volumes from a nozzle, the droplet volume is the volume of the minimum droplet that is printable.

In the invention, the mass ratio of the amount of liquid composition ejected to the amount of ink ejected (liquid composition:ink) required for forming an image pixel is preferably in the range of about 1:30 to 1:1 and more preferably in the range of about 1:20 to 1:1.2.

If the mass ratio of the amount of the liquid composition ejected to the amount of the ink ejected is less than about 1:30, coagulation of colorants is insufficient, occasionally leading to decrease in optical density and worsening blurring and blurring between colors. On the other hand, if the mass ratio of the amount of the liquid composition ejected to the amount of the ink ejected is over about 1:1, the curl and cockle of recording medium may be caused.

The image pixel is a lattice point constituting a desired image when the image is divided both in the main scanning direction and sub-scanning direction into the minimum distance on which the liquid composition can be ejected, and images well controlled in color and image density is formed only by providing an ink set suitable for each image pixel.

Thermal and piezo ink jet recording methods are preferable as the recording method to which the ink jet recording method according to the invention is applied. In the case of thermal ink jet recording method, the viscosity of ink is lower by heating when it is ejected, but the viscosity thereof become drastically higher due to decrease in temperature when it is ejected onto a recording medium. This phenomenon may be the reason why the ink jet recording method is effective in suppressing the blurring and blurring between colors. In contrast, in the case of piezo ink jet process, it is possible to eject high-viscosity liquid and suppress spread of the high-viscosity liquid on the surface of recording medium, and thus the ink jet recording method according to the invention is effective in suppressing blurring and blurring between colors.

Preferable recording media for use in the invention include, for example, 4024 Paper and 4200 Paper (trade names) manufactured by Fuji Xerox Co., Ltd. and P Paper, Multiace Paper, and C2 Paper (trade name) manufactured by Fuji Xerox Co., Ltd. and the like.

EXAMPLES

Hereinafter, the present invention will be described in more detail with reference to Examples, but it should be understood that the invention is not particularly limited to these Examples. Preparation of liquid compositions and inks A chitosan solution, a water-soluble organic solvent, a surfactant, ion-exchange water, a colorant solution, and others are mixed in the compositions shown below, and the resulting liquids are mixed and stirred. Each of the liquids is filtered through a 5-μm filter, to give a desired liquid.

| Liquid compositions | |
|---|---|
| Liquid composition 1 (liquid composition according to the invention] | |
| Aqueous chitosan solution (manufactured by Katokichi Bio) chitosan content: | 1% by mass |
| Citric acid (containing 3 carboxyl groups) | 1% by mass |
| Glycerin | 10% by mass |
| Ethylene oxide (10 mole) adduct of acetylenediol (trade name: Olfine E1010, manufactured by Nisshin Chemicals Co., Ltd.) | 1% by mass |
| Water | the balance |
| Liquid composition 2 (liquid composition according to the invention) | |
| Aqueous chitosan solution (manufactured by Katokichi Bio) chitosan content: | 1% by mass |
| 2-Pyrrolidone-5-carboxylic acid (pyrrolidine ring, having a carboxyl group) | 1% by mass |
| Glycerin | 10% by mass |
| Ethylene oxide (10 mole) adduct of acetylenediol (trade name: Olfine E1010, manufactured by Nisshin Chemicals Co., Ltd.) | 1% by mass |
| Water | the balance |
| Liquid composition 3 | |
| Aqueous chitosan solution (manufactured by Katokichi Bio) chitosan content: | 1% by mass |
| Acetic acid (containing one carboxyl group) | 1% by mass |
| Glycerin | 10% by mass |
| Ethylene oxide (10 mole) adduct of acetylenediol (trade name: Olfine E1010, manufactured by Nisshin Chemicals Co., Ltd.) | 1% by weight |
| Water | the balance |
| Liquid composition 4 (the liquid composition according to the invention) | |
| Aqueous chitosan solution (manufactured by Katokichi Bio) chitosan content: | 1% by mass |
| Benzoic acid (containing one aromatic ring and one carboxyl group) | 1% by mass |
| Glycerin | 10% by mass |
| Ethylene oxide (10 mole) adduct of acetylenediol (trade name: olefin E1010, manufactured by Nisshin Chemicals Co., Ltd.) | 1% by mass |
| Water | the balance |
| Liquid composition 5 (the liquid composition according to the invention) | |
| Aqueous chitosan solution (manufactured by Katokichi Bio) chitosan content: | 1% by mass |
| Citric acid (having 3 carboxyl groups) | 1% by mass |
| Glycerin | 10% by mass |
| Water | the balance |
| Inks | |
| Ink 1 (black) | |
| Bonjet Black CW-2 (trade name, manufactured by Orient Chemical Industries) pigment content: | 5% by mass |
| Glycerin | 10% by mass |
| Ethylene oxide (10 mole) adduct of acetylenediol (trade name: olefin E1010, manufactured by Nisshin Chemicals Co., Ltd.) | 1% by mass |

-continued

| Liquid compositions | |
|---|---|
| Water | the balance |
| Ink 2 (yellow) | |
| C.I. Direct Yellow 144 | 3% by mass |
| Glycerin | 10% by mass |
| Ethylene oxide (10 mole) adduct of acetylenediol (trade name: olefin E1010, manufactured by Nisshin Chemicals Co., Ltd.) | 1% by mass |
| Water | the balance |
| Ink 3 (black) | |
| Bonjet Black CW-2 (trade name, manufactured by Orient Chemical Industries) pigment content: | 5% by mass |
| Glycerin | 10% by mass |
| Water | the balance |
| Ink 4 (yellow) | |
| C.I. Direct Yellow 144 | 3% by mass |
| Glycerin | 10% by mass |
| Water | the balance |

The surface tension and the viscosity of the liquid compositions 1 to 5 and inks 1 to 4 are determined. The surface tension is determined under an environment of 23° C. and 55% RH by using a Wilhelmy surface tension balance. The viscosity is determined at 23° C. and a shear rate of 1400 s$^{-1}$ by using a rotational viscometer, Rheomat 115 (trade name, manufactured by Contraves Co.).

The results are summarized in Table 1.

Examples 1 to 4 and Comparative Examples 1 to 3

At first, the drying property and the storage stability of respective liquid compositions 1 to 5 and inks 3 and 4 are evaluated. The drying property and storage stability are evaluated as follows:

Drying Property Evaluation

By using each solution and a trial ink jet printer having a resolution of 360 dpi (ejection quantity: about 30 pl; ink ejection: about 6 ml/m$^2$; printing: batch printing on one face; and head scan speed: about 50 cm/sec), a closely overlapping image is printed on the 4024 Paper (trade name, manufactured by Fuji Xerox Co., Ltd.) under an environment of 20° C. and 50% RH, and after 2 seconds, another 4024 Paper is placed on the closely overlapping image under a load of 100 g/m$^2$ and the extent of the resulting ink transfer is evaluated according to the following criteria:
A: There is no transfer observed.
B: There is some transfer observed.
C: There is extensive transfer.

Storage Stability Evaluation

After each solution is left under an environment of 70° C. for 300 hours, presence of sediments is evaluated by visual observation according to the following criteria:
A: There is no observable sedimentation.
B: There is some sedimentation.
C: There is extensive sedimentation.

The evaluation results above are summarized in Table 1.

TABLE 1

| | Liquid No. | Surface tension (mN/m) | Viscosity (mPa·s) | Drying time evaluation | Storage stability |
|---|---|---|---|---|---|
| Example 1 | Liquid composition 1 | 33.2 | 2.8 | A | A |
| Example 2 | Liquid composition 2 | 33.0 | 2.6 | A | A |
| Example 3 | Liquid composition 5 | 37.2 | 2.7 | A | A |
| Example 4 | Liquid composition 4 | 33.3 | 2.8 | A | B |
| Comparative Example 1 | Liquid composition 3 | 33.4 | 2.6 | A | C |
| Comparative Example 2 | Ink 3 | 36.3 | 2.4 | B | A |
| Comparative Example 3 | Ink 4 | 38.0 | 2.3 | B | A |

As is apparent from Table 1, the liquid compositions are superior in drying property than the inks, but liquid compositions wherein chitosan is dissolved by using acetic acid which is a volatile organic acid or benzoic acid of an aromatic ring system have lower storage stability.

Examples 5 to 8 and Comparative Examples 4 and 5

The blurring and the water resistance of each liquid shown in Table 2 are evaluated. An image is printed by using a trial multi-path printing thermal ink jet printer for evaluation having a resolution of 360 dpi provided with three ink jet printing heads placed one by one (ink ejection: about 30 pl, ink ejection: about 6 ml/m$^2$, printing: batch printing on one face; and head scan speed: about 40 cm/sec). One of the heads is for ink ejection, while two of the heads are for ejection of the liquid compositions. The recording medium used is the 4024 Paper (trade name, manufactured by Fuji Xerox Co., Ltd.) and the like. In regard to the order of ejection, liquid compositions are first ejected onto the image-forming portion (only ink is used for printing in Comparative Examples 4 and 5), and the mass ratio of the liquid for image pixel formation to the ink (liquid composition/ink) is ½. The printing is performed at 20° C. and 50% RH.

The blurring and the water resistance of the printed image is evaluated as follows:

Blurring

Printed characters are evaluated by visual observation according to the following criteria:
A: There is no observable blurring in characters.
B: There is some observable bleeding of characters, which is practically not problemsome.
C: There is significant blurring of characters.

Water Resistance

The printed medium is left for 1 hour, immersed in water for 3 seconds, and the resulting printed characters thereon are evaluated by visual observation according to the following criteria:
A: There is no blurring of printed characters.
B: There is some blurring of printed characters, which is not practically problemsome.
C: There is significant blurring.

The results are summarized in Table 2.

TABLE 2

| | Liquid composition No. | Ink No. | Blurring | Water resistance |
|---|---|---|---|---|
| Example 5 | 1 | 1 | A | A |
| Example 6 | 1 | 2 | A | A |
| Example 7 | 2 | 1 | A | A |
| Example 8 | 2 | 2 | A | A |
| Comparative Example 4 | — | 1 | B | B |
| Comparative Example 5 | — | 2 | B | C |

As is apparent from the results in Table 2, by applying the liquid composition according to the invention, i.e., liquid compositions 1 and 2, first on a printing medium before applying the ink containing a colorant, it is possible to suppress the blurring and increase the water resistance of printed images.

Examples 9 to 10 and Comparative Example 6

The blurring between colors of each solution shown in Table 3 is evaluated. An image is printed in a similar manner except that one of the three heads placed one by one in the printer used for evaluation of the blurring and water resistance is used for the liquid composition and two of them for inks 1 and 2 (an image is formed only with the inks in Comparative Example 6).

The inter-color bleeding is evaluated by visual observation of the prints formed in a single scanning of the head so that the dot line of ink 1 is placed in the neighborhood of the closely overlapping prints of ink 2 according to the following criteria:
A: There is no observable blurring between colors.
B: There is some observable blurring between colors.
C: There is significant blurring.
The evaluation results are summarized in Table 3.

TABLE 3

| | Liquid composition No. | Blurring between colors |
|---|---|---|
| Example 9 | 1 | A |
| Example 10 | 2 | A |
| Comparative Example 6 | — | C |

As is apparent from Table 3, by printing an ink over the liquid composition containing chitosan according to the invention, it is possible to suppress the blurring between colors of the printed images.

As described above, the ink jet recording method according to the invention, which makes the most of chitosan's ability of binding and coagulating colorants containing, the higher affinity to paper, and the ability of forming a film on paper, permits increase in the water resistance of printed images and suppression of the blurring and the blurring between colors of printed images.

What is claimed is:

1. An ink jet liquid composition which comprises chitosan and a non-volatile organic acid, wherein the non-volatile organic acid has a cyclic structure other than an aromatic ring and two or more carboxyl groups.

2. A liquid composition according to claim 1, wherein the surface tension thereof is 35 mN/m or less.

3. A liquid composition according to claim 1, wherein the deacetylation degree of the chitosan is 70% or more.

4. An ink jet liquid composition which comprises chitosan and a non-volatile organic acid, wherein the non-volatile organic acid is 2-pyrrolidone-5-carboxylic acid.

5. A liquid composition according to claim 1, wherein the non-volatile organic acid has three or more carboxyl groups.

6. A liquid composition according to claim 1, wherein the non-volatile organic acid is an organic acid containing a compound having at least one of a pyrrolidine ring and a cyclohexane ring.

7. A liquid composition according to claim 1, wherein the mass ratio of the chitosan to the non-volatile organic acid is in the range of 1:50 to 50:1.

8. A composition according to claim 1, wherein the total amount of the chitosan and the non-volatile organic acid is in the range of 0.1 to 10% by mass with respect to the total amount of the composition.

9. An ink jet recording method of forming images on a recording medium surface by ejecting an ink and a liquid composition thereon so that the ink and the liquid composition are in contact with each other, wherein:
the ink contains a colorant;
the liquid composition contains a component for coagulating the colorant; and
the component for coagulating the colorant contains chitosan and a non-volatile organic acid wherein the non-volatile organic acid has a cyclic structure other than an aromatic ring and two or more carboxyl groups.

10. A method according to claim 9, wherein the surface tension of the liquid composition is 35 mN/in or less.

11. A method according to claim 9, wherein the deacetylation degree of the chitosan is 70% or more.

12. An ink jet recording method of forming images on a recording medium surface by ejecting an ink and a liquid composition thereon so that the ink and the liquid composition are in contact with each other, wherein:
the ink contains a colorant;
the liquid composition contains a component for coagulating the colorant; and
the component for coagulating the colorant contains chitosan and a non-volatile organic acid wherein the non-volatile organic acid is 2-pyrrolidone-5-carboxylic acid.

13. A method according to claim 9, wherein the non-volatile organic acid has three or more carboxyl groups.

14. A method according to claim 9, wherein the non-volatile organic acid is an organic acid containing a compound having at least one of a pyrrolidine ring and a cyclohexane ring.

15. A method according to claim 9, wherein the colorant contained in the ink is a pigment.

16. An ink set for ink jet recording, comprising an ink and a liquid composition, wherein:
the ink contains a colorant;
the liquid composition contains a component for coagulating the colorant; and
the component for coagulating the colorant contains chitosan and a non-volatile organic acid wherein the non-volatile organic acid has a cyclic structure other than an aromatic ring and two or more carboxyl groups.

* * * * *